(12) United States Patent
Carver et al.

(10) Patent No.: US 6,452,681 B1
(45) Date of Patent: Sep. 17, 2002

(54) OPTICAL SPECTRUM ANALYZER

(75) Inventors: Gary E. Carver, Raritan Township Hunterdon County, NJ (US); William R. Holland, Warrington, PA (US)

(73) Assignee: Fitel USA Corp, Norcross, GA (US)

( * ) Notice: Subject to any disclaimer, the term of this patent is extended or adjusted under 35 U.S.C. 154(b) by 0 days.

(21) Appl. No.: 09/338,226

(22) Filed: Jun. 22, 1999

(51) Int. Cl.[7] .................................................. G01B 9/11
(52) U.S. Cl. ........................ 356/450; 356/477; 356/451
(58) Field of Search .............................. 356/450, 451, 356/477, 478; 359/123, 124, 135

(56) References Cited

U.S. PATENT DOCUMENTS

| 5,155,785 | A | 10/1992 | Holland et al. |
|---|---|---|---|
| 5,259,051 | A | 11/1993 | Burack et al. |
| 5,309,534 | A | 5/1994 | Cohen et al. |
| 5,421,930 | A | 6/1995 | Holland |
| 5,461,475 | A | 10/1995 | Lerner et al. |
| 5,680,490 | A | 10/1997 | Cohen et al. |
| 6,091,525 | A | * | 7/2000 | Cundiff ...................... 359/110 |

* cited by examiner

Primary Examiner—Frank G. Font
Assistant Examiner—Andrew H. Lee
(74) Attorney, Agent, or Firm—Law Offices of John De La Rosa

(57) ABSTRACT

The present invention is an optical spectrum analyzer (OSA) comprising a tree-structure of N-stage wavelength filters or "wavelength slicer" which "slice" the incident optical signal into desired groupings of individual sliced spectral components, each along a different output optical fiber. Cascaded fiber Bragg gratings and delay lines coupled to each output optical fiber then uniquely map the "sliced" spectral components into the time domain such that each spectral component is allocated a unique time slot.

44 Claims, 13 Drawing Sheets

FIG. 3
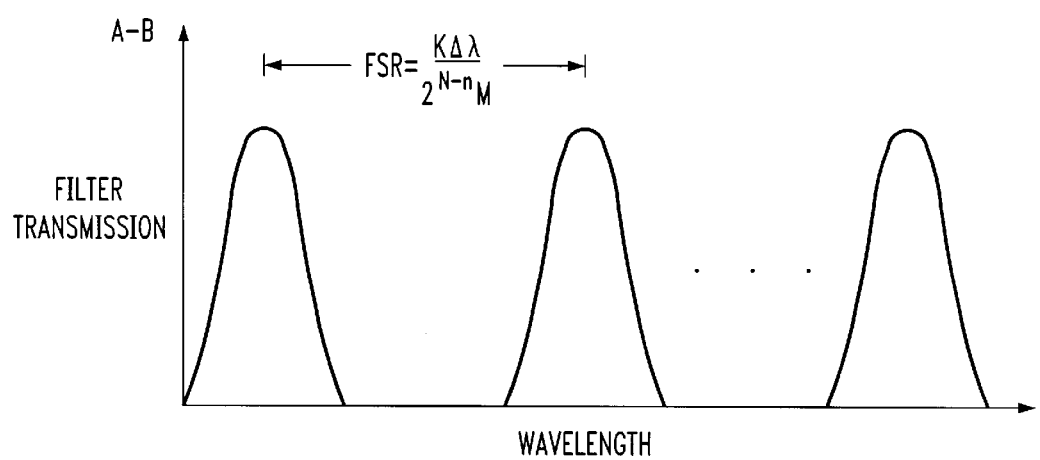
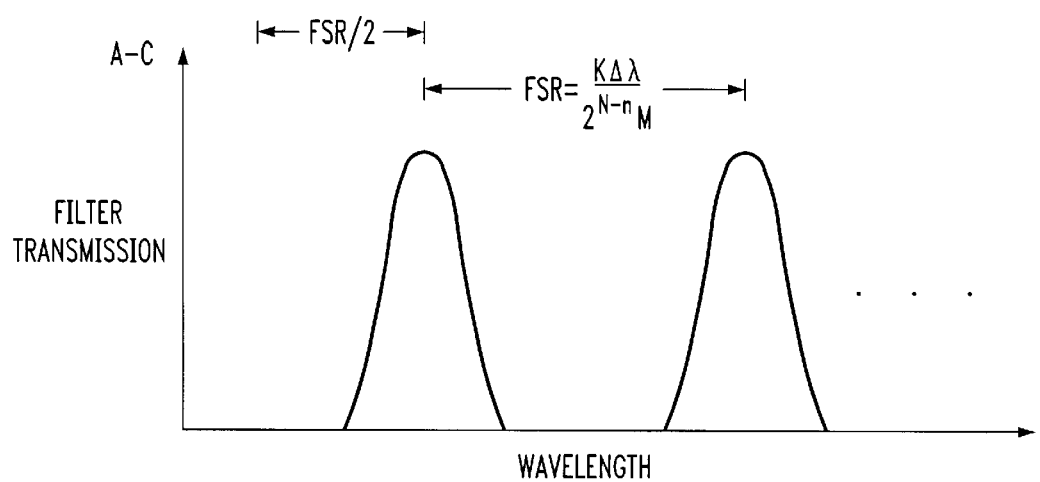

FIG. 5
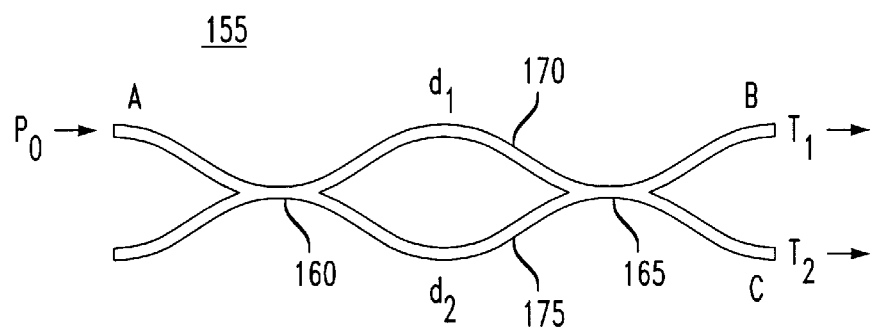
FIG. 6
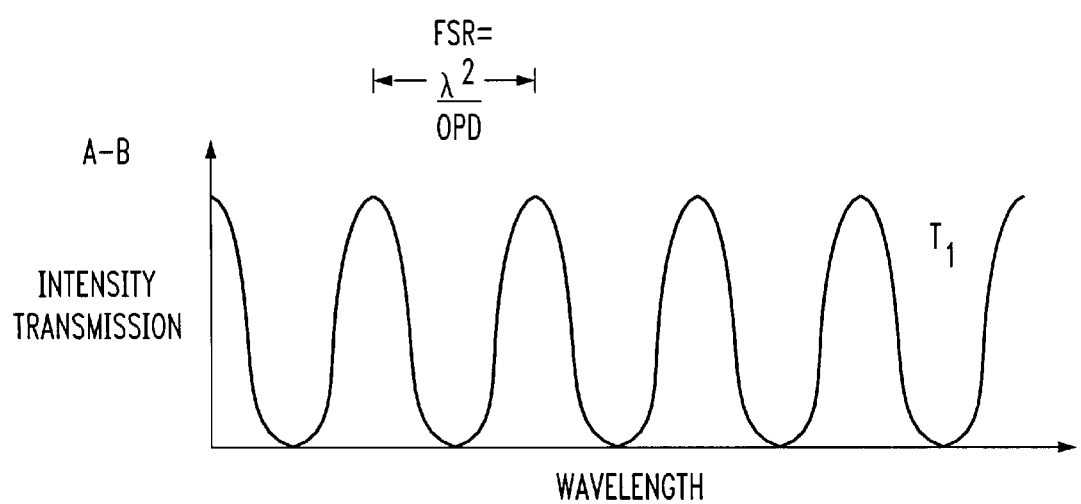
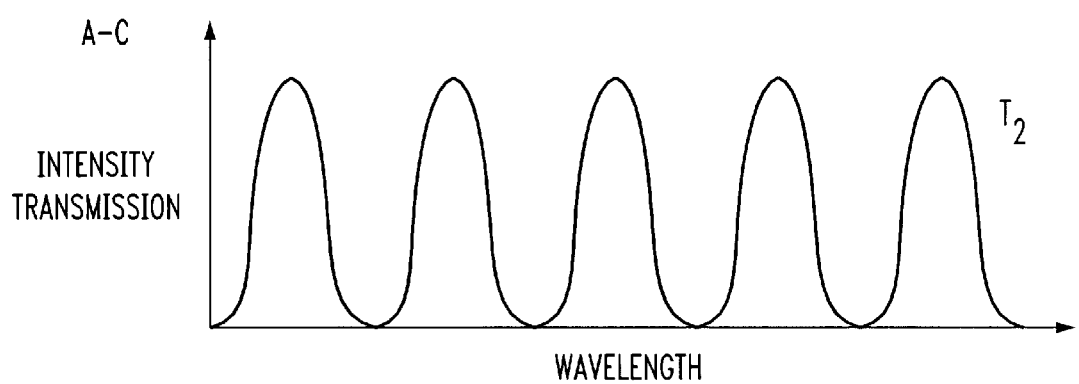

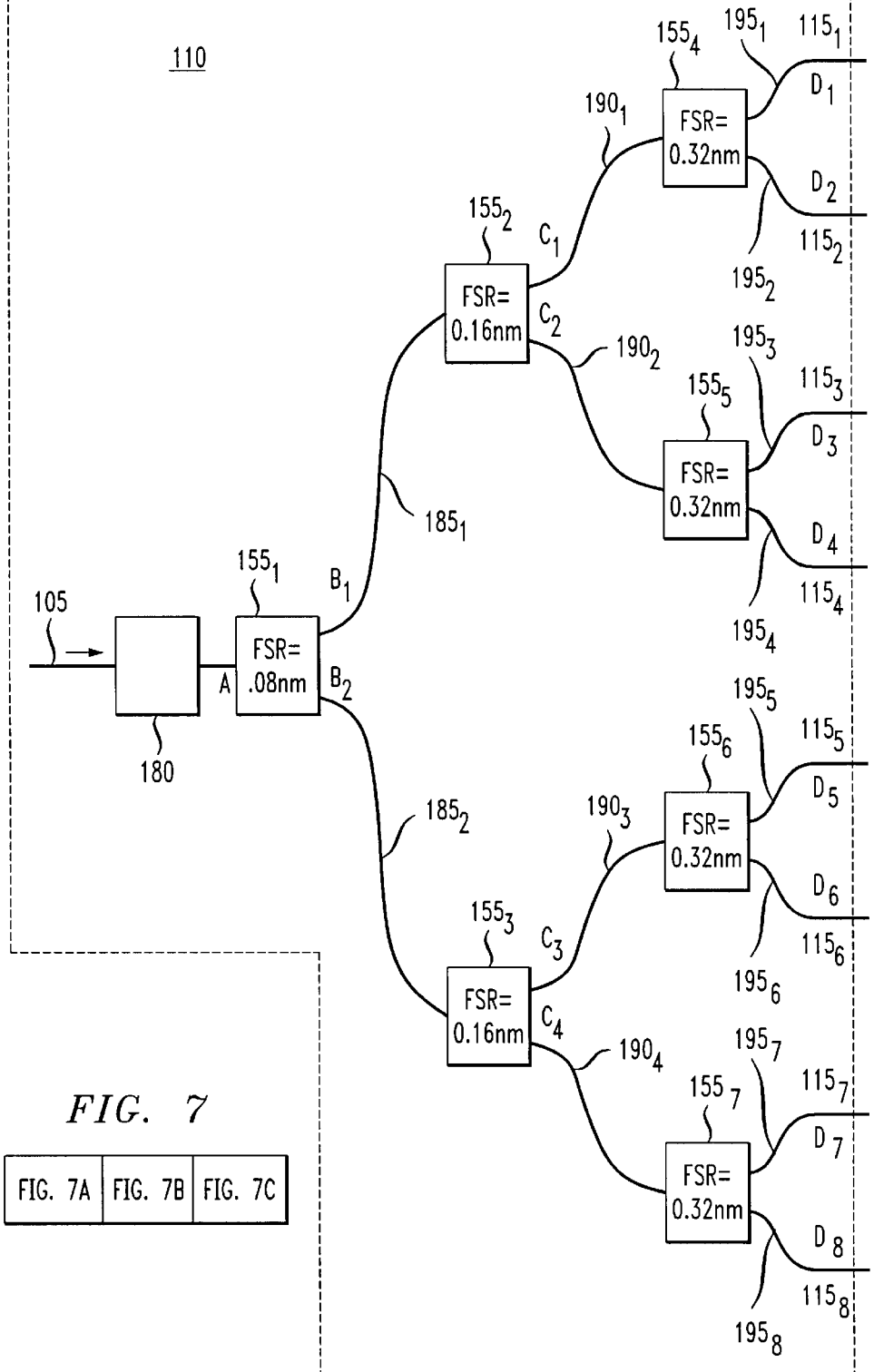

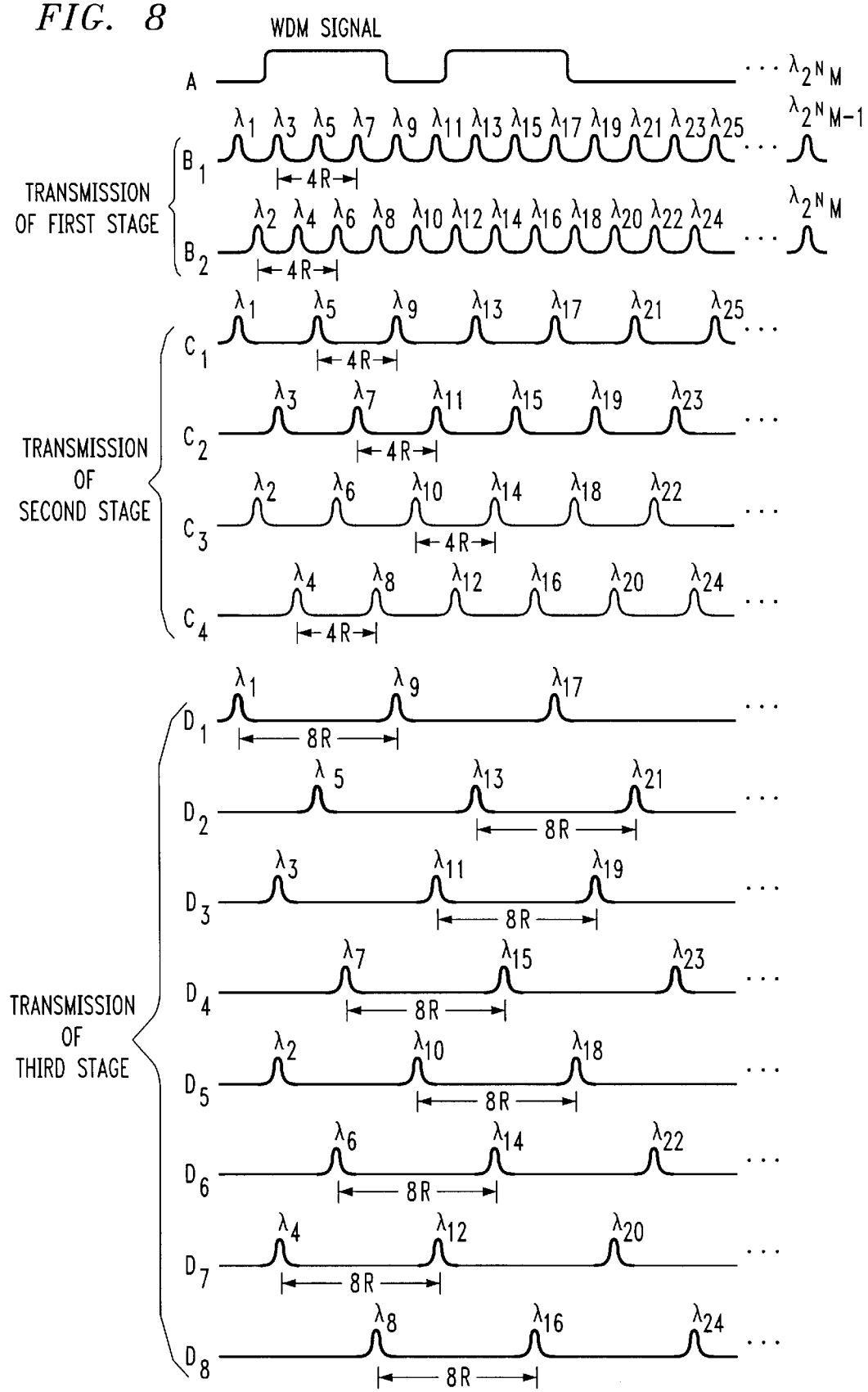

FIG. 11
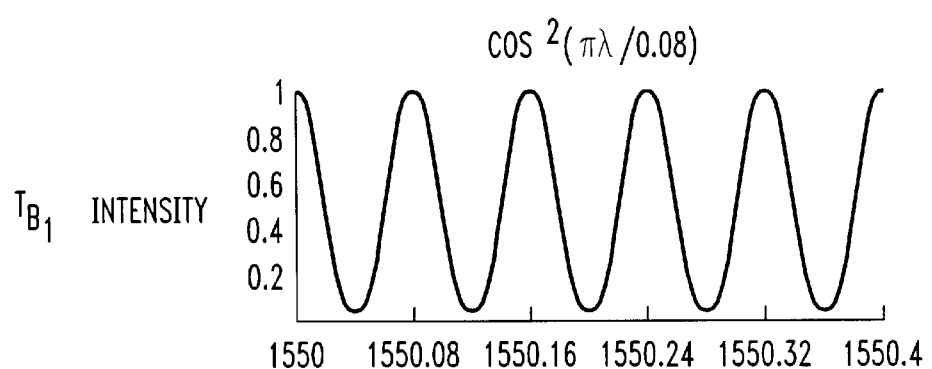
(a)
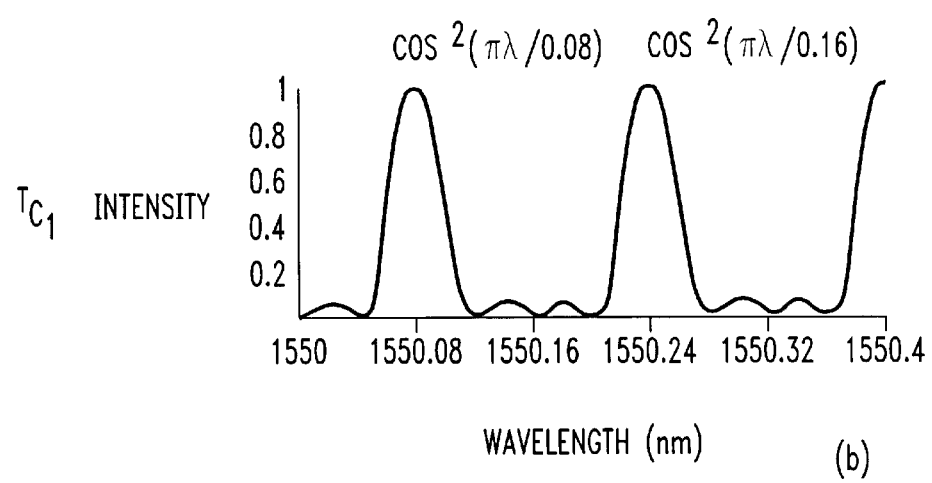
(b)
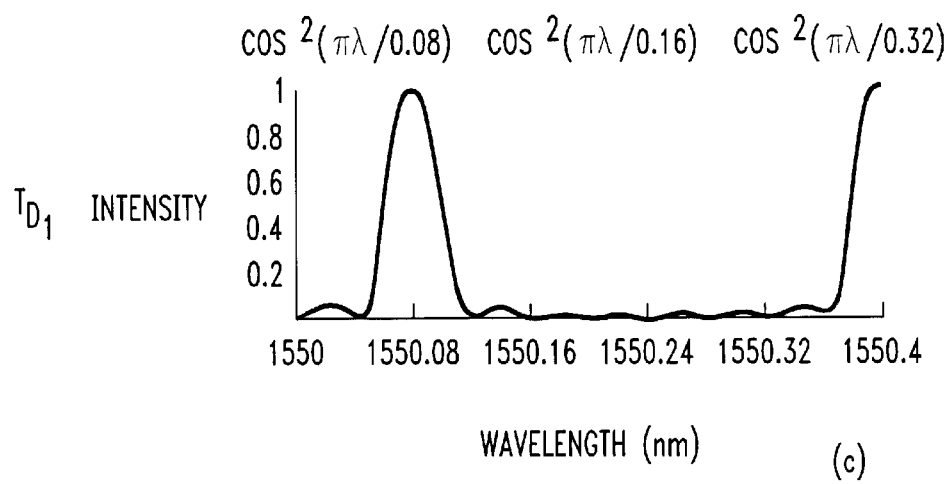
(c)

OPTICAL SPECTRUM ANALYZER

TECHNICAL FIELD

The present invention relates to an optical spectrum analyzer (OSA) for measuring the optical power as a function of wavelength, and, more particularly, the spectral characteristics of optical channels in a wavelength division multiplexed (WDM) communication system.

BACKGROUND OF THE INVENTION

Current WDM communication systems strive for maximum transmission capacity by spacing optical channels as closely as possible, typically less than a nanometer (nm). As the channel spacing, however, decreases, monitoring the spectral characteristics of the channels becomes more critical in verifying system functionality, identifying performance drift, and isolating system faults. For example, such monitoring is critical in detecting wavelength drift, which can readily cause signals from one optical channel to cross into another. Also, with the recent use of optical amplifiers, real-time feedback to network elements has become increasing critical to ensure stable operation.

Optical instruments, called optical spectrum analyzers (OSAs), are known in the art, however, for measuring the optical power as a function of wavelength. Indeed, most conventional OSAs use a wavelength tunable optical filter, such as a Fabry-Perot interferometer or diffraction grating, to resolve the individual spectral components. In the latter case, light is reflected off the diffraction grating at an angle proportional to the wavelength. This is so, inasmuch as the grating lines cause the reflected rays to undergo constructive interference only in very specific directions. The spectrum of the light is then analyzed on the basis of the angle at which the light is diffracted using a detector array. Alternatively, the diffracted light is moved over a slit and then detected using a small detector.

Alternatively, a Fabry-Perot interferometer may be used consisting of two highly reflective, parallel mirrors that act as a resonant cavity, which transmits light only at a unique frequency (wavelength). Wavelength tuning may be accomplished by varying the mirror spacing or rotating the interferometer with respect to the incident light so as to provide an optical spectrum analysis.

Other OSAs known in the art are based on the Michelson interferometer, wherein the incident light is split into two paths. One path is fixed in length, and the other is variable so as to create an interference pattern between the signal and a delayed version of itself, known as an interferogram. The wavelength of the incident light can be determined by comparing the zero crossings in the interferogram with those for a known wavelength standard. The optical spectrum, however, is determined by performing a Fourier transform on the interferogram.

Although conventional OSAs perform acceptably, they are generally bulky as well as costly. Furthermore, it may take from a few seconds to a few minutes to obtain the optical spectrum, unsuited for next generation WDM communication systems that operate near or in excess of 10 Gbps, which require real-time monitoring.

Accordingly, it would be desirable to provide for a low cost, compact OSA capable of determining the spectral characteristics of the optical channels in real time.

SUMMARY OF THE INVENTION

The present invention is an optical spectrum analyzer (OSA) comprising a tree-structure of N-stage wavelength filters, a "wavelength slicer," which "slices" the incident optical signal into desired groupings of individual "sliced" spectral components, each along a different output optical fiber. Cascaded fiber Bragg gratings and delay lines coupled to each output optical fiber then uniquely map the "sliced" spectral components into the time domain such that each spectral component is allocated a unique time slot.

In one embodiment, the optical spectrum analyzer comprises a three-stage, tree-structure of Mach-Zehnder interferometers which successively "slice" a WDM optical signal into eight (8) groupings of alternating spectral components. Each of the individual spectral components in each of the groupings is then allocated a unique time slot using two sets of delay lines, implemented preferably using fibers. A first set of delays delays each spectral component within each grouping of spectral components by a multiple integer time period. For each optical fiber, fiber Bragg gratings are also arranged such that the shortest wavelength spectral components are reflected first and the longest last. Then, second sets of delays disposed between each fiber Bragg grating, delay the reflections from each successive fiber Bragg grating so as to offset each new grouping of sliced spectral components uniformly in the time domain. In this latter manner, each sliced spectral component is thus allocated a unique slot within the time domain for conversion into an electrical signal by corresponding optical detectors.

In a second embodiment, a single stage is employed which, instead, "slices" the WDM optical signal into four consecutive bands of "sliced" spectral components. Similarly, each spectral component in each of the four bands of "sliced" spectral components is then allocated a unique time slot using two sets of delay lines. A first set of delays delays each band of spectral components by a multiple integer time period such that each of four bands is separated from one another in the time domain. Fiber Bragg gratings having corresponding transmission peaks are again arranged such that the shortest wavelength spectral components within each band are reflected first and the longest wavelength last. Additionally, second sets of delays delay the reflections from each successive fiber Bragg grating by an amount that offsets each desired sliced spectral component from one another in the time domain.

BRIEF DESCRIPTION OF THE DRAWINGS

The features and advantages of the present invention will become more readily apparent from the following detailed description of the invention in which like elements are labeled similarly and in which:

FIG. 3 is a graph illustrating the filter transmissions of the passbands of the "wavelength slicing" stage of FIG. 2;

FIG. 5 is an illustration of a fiber based Mach-Zehnder interferometer;

FIG. 6 is a graph of the intensity transmissions of the Mach-Zehnder interferometer of FIG. 5;

FIG. 8 is a graph of the sliced spectral components in the optical spectrum analyzer of FIG. 7;

FIG. 11 is a graph of the intensity transmissions of the upper arms of the Mach-Zehnder interferometers in the optical analyzer spectrum of FIG. 7;

DETAILED DESCRIPTION

The present invention is an optical spectrum analyzer (OSA) for measuring the power versus wavelength spectrum for an optical signal. It is based, in part, on the mapping of the spectral components of the incident optical signal into the time domain using a two-stage dispersive optical system, consisting preferably of all fiber based Mach-Zehnder interferometers, delay lines, and Bragg gratings, as discussed more fully herein below.

More specifically, a tree-structure of N-stage wavelength filters or "wavelength slicer" functions to "slice" the incident optical signal into desired groupings of individual "sliced" spectral components, each grouping transmitted along a different output optical fiber. Cascaded fiber Bragg gratings and delay lines coupled to each output optical fiber then uniquely map the sliced spectral components into the time domain. That is, each spectral component is allocated a unique time slot for conversion into an electrical signal by a corresponding optical detector. Although requiring post processing in the time domain, such a tree and pipe-line architecture can be readily fabricated with fibers, which reduces cost and complexity, among other things.

Without any loss of generality or applicability for the principles of the invention, the preferred embodiments are described with respect to measuring the spectral characteristics of optical wavelength channels in a WDM communication system. It should be clearly understood, however, that the present inventive OSA is capable of measuring the optical spectrum, in general, of a broadband light source.

Figure 1:
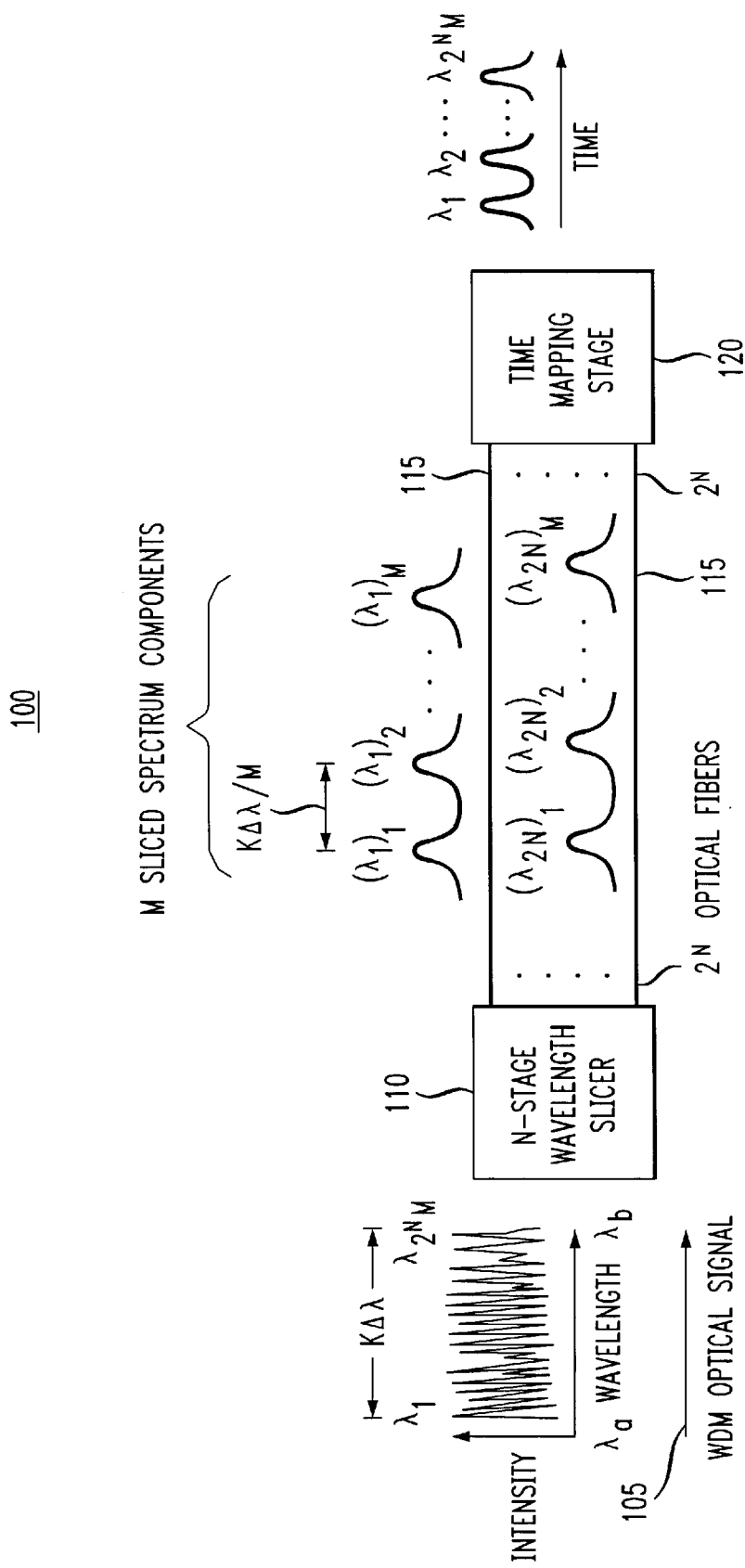
FIG. 1 is a generalized block diagram showing an optical spectrum analyzer in accordance with the principles of the invention.

Shown in FIG. 1 is a generalized OSA 100 in accordance with the principles of the invention applied to measuring the spectral characteristics of a WDM signal 105 carrying k independent optical channels separated $\Delta\lambda$ apart from $\lambda_a$ to $\lambda_b$. Each of the k optical channels is allocated a unique band of wavelengths of width up to $\Delta\lambda$, over which information is transmitted using well-known modulation techniques. WDM signal 105, which preferably occupies a total bandwidth of $k\Delta\lambda$ in the commonly used 1.528–1.560 $\mu$m "C-Band," is to be resolved into $2^N M$ individual spectral wavelength components, herein denoted as $$\sum_{1}^{2^N M} \lambda_i = \lambda_1 \ldots \lambda_{2^N M},$$

with a corresponding resolution R of $$\frac{k\Delta\lambda}{2^N M},$$

where N and M are integers. Note that $\lambda_i$ herein refers to corresponding spectral components at intervals of $$\frac{k\Delta\lambda}{2^N M}$$

from $\lambda_a$ to $\lambda_b$.

WDM signal 105 is optically coupled to an N stage filter or a so-called "wavelength slicer" 110 for filtering or "slicing" into $2^N$ desired groupings of individual sliced spectral wavelength components $(\lambda_{-1})_1 \ldots (\lambda_{-1})_M$ through $(\lambda_{-2^N})_1 \ldots (\lambda_{-2^N})_M$, transmitted along $2^N$ optical fibers $115_1$ through $115_{2^N}$, respectively. Each $2^N$ wavelength grouping consists of M individual "sliced" spectral components, spaced $$\frac{k\Delta\lambda}{M}$$

or every other $2^{N^{th}}$ wavelength component, as discussed herein below. The actual sliced spectral components that appear on optical fibers $115_1$–$115_{2^N}$, however, are dependent on the number of stages, among other things.

Figure 2:
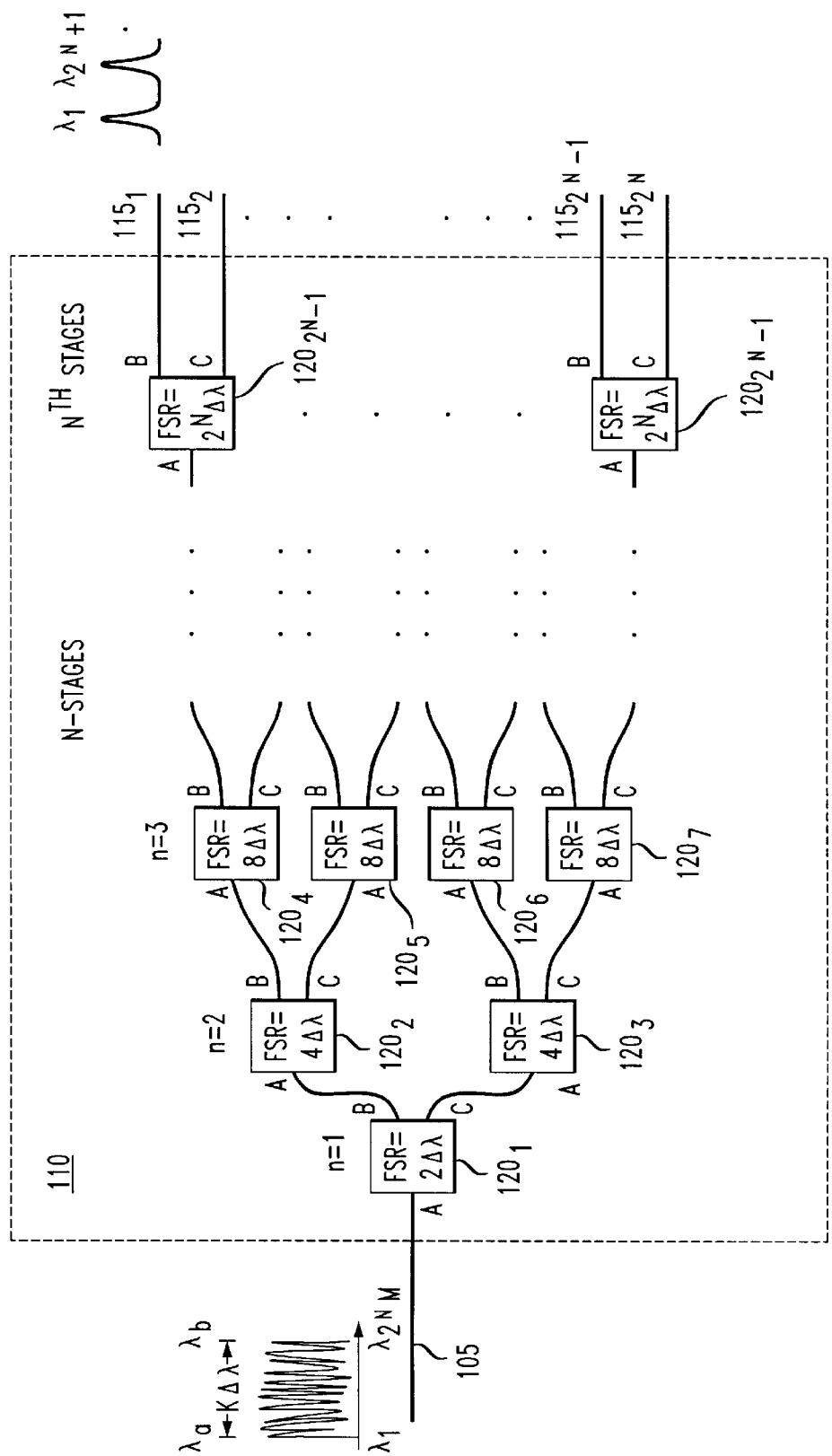
FIG. 2 is a block diagram of the "wavelength slicing" stage of the optical spectrum analyzer of FIG. 1.

Referring to FIG. 2, this so-called "wavelength slicing" function may be performed by utilizing $2^N - 1$ filters $120_1 \ldots 120_{2^N - 1}$ configured preferably in a tree architecture. Each filter $120_1 \ldots 120_{2^N - 1}$ has an input fiber port A, and two output fiber ports B and C, each which exhibit periodic transmission passbands of a free spectral range (FSR) of $$\frac{k\Delta\lambda}{2^{N-n}M}$$

(n=1, 2 ... N), as depicted in FIG. 3, wherein n is the stage number, and N is the total number of stages. Importantly, note that the transmission passbands for ports A-B and A-C are offset by half the FSR, such that the centers of the passbands uniquely match corresponding "sliced" spectral components transmitted on ports B and C. In effect, this "slicing" optically samples WDM signal 105 with an overall resolution of the first-stage filter's FSR divided by two, wherein the sampled or sliced spectral components, appear alternating on the output ports.

Referring again to FIG. 2, for each successive stage, the transmission of sliced spectral components of WDM signal 105 inputted to fiber port A are alternated between the two output fiber ports B, C as the wavelength at port A changes. With each grouping of the so-called "sliced" wavelength components coupled into the input fiber port of a next-stage filter having twice the FSR as the previous stage, $2^N$ groupings of "sliced" spectral wavelength components spaced $$\frac{k\Delta\lambda}{M}$$

appear at optical fibers $115_1 \ldots 115_{2^N}$. As such, a different grouping of every $2^{N^{th}}$ spectral component of WDM optical signal 105 is transmitted on each optical fiber $115_1 \ldots 115_{2^N}$.

Figure 4:
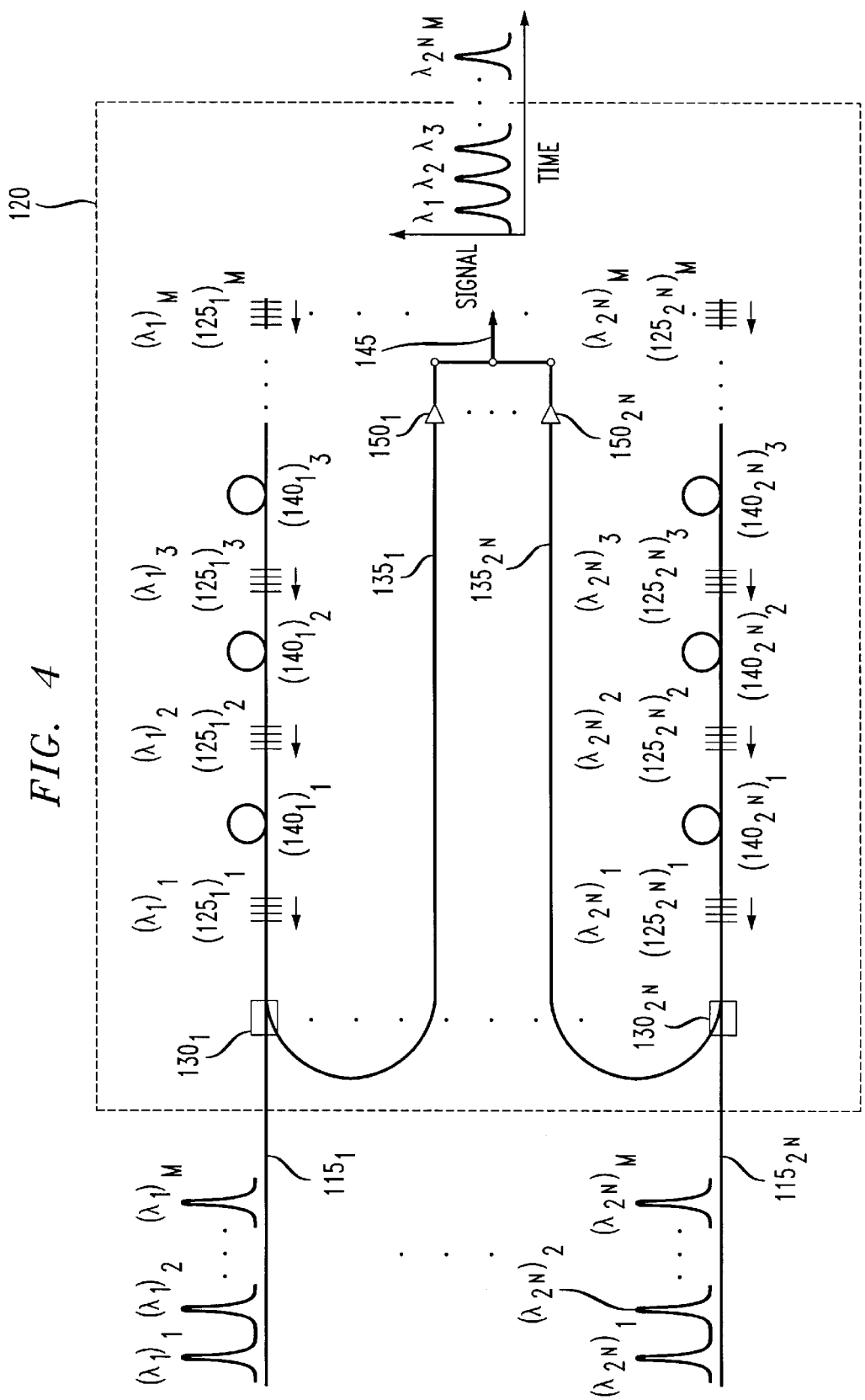
FIG. 4 is a block diagram of the "time mapping" stage of the optical spectrum analyzer of FIG. 1.

Referring back to FIG. 1, the present invention also utilizes a time slot allocation stage 120 so as to then uniquely map into the time domain the groupings of sliced spectral components $(\lambda_1)_1 \ldots (\lambda_1)_M$ through $(\lambda_{2^N})_1 \ldots (\lambda_{2^N})_M$. As shown in FIG. 4, on the $2^N$ optical fibers $115_1 \ldots 115_{2^N}$, there are M cascaded fiber Bragg gratings $(125_1)_1 \ldots (125_1)_M$ through $(125_{2^N})_1 \ldots (125_{2^N})_M$, respectively, each reflecting one of the corresponding M spectral components while transmitting all other unselected components. As such, the transmission peaks, i.e., Bragg wavelengths, of the fiber Bragg gratings corresponding to each optical fiber $115_1 \ldots 115_{2^N}$ are similarly spaced at intervals of $$\frac{k\Delta\lambda}{M}$$

from $\lambda_a$ to $\lambda_b$.

Optical couplers or circulators $130_1$–$130_{2^N}$ couple the corresponding "sliced" wavelength components $(\lambda_1) \ldots (\lambda_1)_M$ through $(\lambda_{2^N})_1 \ldots (\lambda_{2^N})_M$ into time slot allocation stage 120, while allowing reflected spectral components from the fiber Bragg gratings to egress therefrom along optical fibers $135_1$–$135_{2^N}$.

Those skilled in the art will readily note that the fiber Bragg grating consists of a periodic variation in the refractive index of the corresponding fiber's core, which variation in the figures has been denoted by heavy marks. The fiber Bragg gratings may be fabricated by exposing the fiber to UV radiation through, for example, a single phase grating mask. Of course, chirped as well as apodized fiber Bragg gratings may be employed to vary the strength and length of the variations in the refractive index so as to remove unwanted sidelobes.

Importantly, fiber Bragg gratings $(125_2)_1 \ldots (125_2)_M$ through $(125_{2^N})_1 \ldots (125_{2^N})_M$ are arranged such that the shortest wavelength spectral components are reflected first and the longest wavelength components last. Fiber-based delay lines $(140_1)_1 \ldots (140_1)_{M-1}$ through $(140_{2^N})_1 \ldots (140_{2^N})_{M-1}$, judiciously disposed, for example, between each fiber Bragg grating, delay the reflections from each successive grating such that each spectral component is correspondingly delayed so as to be uniformly separated in time, and in the order of its spectral wavelength number (i.e., $\lambda_1 < \lambda_2 < \ldots \lambda_{2^N}$). In doing so, each spectral component is thus allocated a unique slot within the time domain for conversion into an electrical signal 145 by corresponding optical detectors $150_1 \ldots 150_{2^N}$ coupled to optical fibers $135_1$–$135_{2^N}$, respectively. Since the amplitude peaks of electrical signal 145 correspond to the optical power in the spectral components of WDM signal 105, a display of the optical power as a function of wavelength can be readily obtained. This latter temporal mapping of the individual $2^N M$ sliced spectral components of WDM signal 105 is shown in the depiction of electrical signal 145 of FIGS. 1 and 4.

Referring to FIG. 5, N-stage filter structure 110 is preferably constructed by utilizing unbalanced fiber-based Mach-Zehnder interferometers 155. Mach-Zehnder interferometers 155 each consists of input and output couplers 160, 165, such as 50/50 splitters and the like, interconnected by two fibers 170, 175 of unequal lengths $d_1$, $d_2$ which introduce a desired phase difference between the signals. Note that the fibers between the couplers are referred to as interferometer arms.

The basic operating principle is that the incident optical signal $P_O$ is split into the two arms 170, 175 of the interferometer. When the optical signals recombine, some or all of the optical power in one arm is transferred to the other because the signals interfere with each other, depending on the amount of phase difference between arms 170, 175.

However, with the phase difference dependent on wavelength, such a device exhibits periodic passbands, wherein the intensity transmissions $T_1$, $T_2$ are calculated to be in the main branch B $$T_1 = \cos^2\left(\frac{\Pi\lambda}{FSR}\right)$$

and, in the secondary branch C, $$T_2 = \sin^2\left(\frac{\Pi\lambda}{FSR}\right)$$

which are complementary, i.e., $T_1 + T_2 = 1$.

As depicted in FIG. 6, the adjacent transmission peaks within the same arm of the interferometer are spaced apart by the free spectral range (FSR), and given by $$FSR = \frac{\lambda^2}{OPD}$$

where OPD is the optical path difference between the arms of the interferometer.

Note that the Mach-Zehnder interferometer performs the above so-called "wavelength slicing" by transmitting on each output branch, alternate spectral components of the incident optical signal with respect to the input, which alternating spectral components are separated by FSR. With respect to a multiplexed optical signal, a WDM optical stream with channel spacing of $\Delta\lambda$ will be divided between the two outputs, such that alternate spectral components with a resolution FSR go to outputs B and C.

Although due to cost and packing considerations, the Mach-Zehnder interferometers are preferably implemented with discrete optical fibers, they may alternatively be implemented with an integrated optical device using planar waveguides. Of course, other suitable optical devices may be used to construct tree-structure filter 110, such as WDM demultiplexers, routers or filters, using the acoustooptic optic or electro-absorption effects.

Figure 7B:
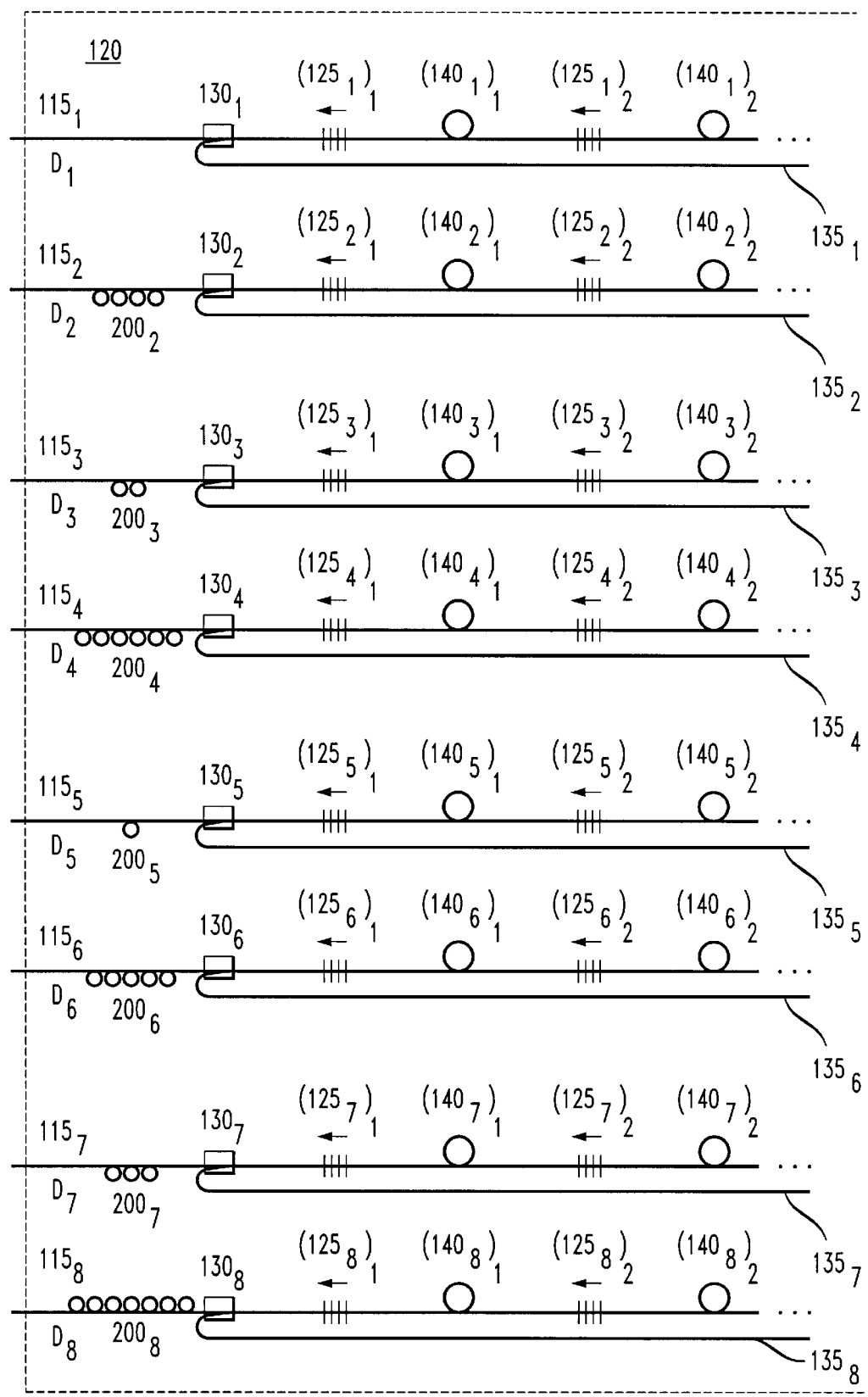
FIG. 7 is a block diagram of a first embodiment of an optical spectrum analyzer employing a three-stage "wavelength slicing" stage.
Figure 7C:
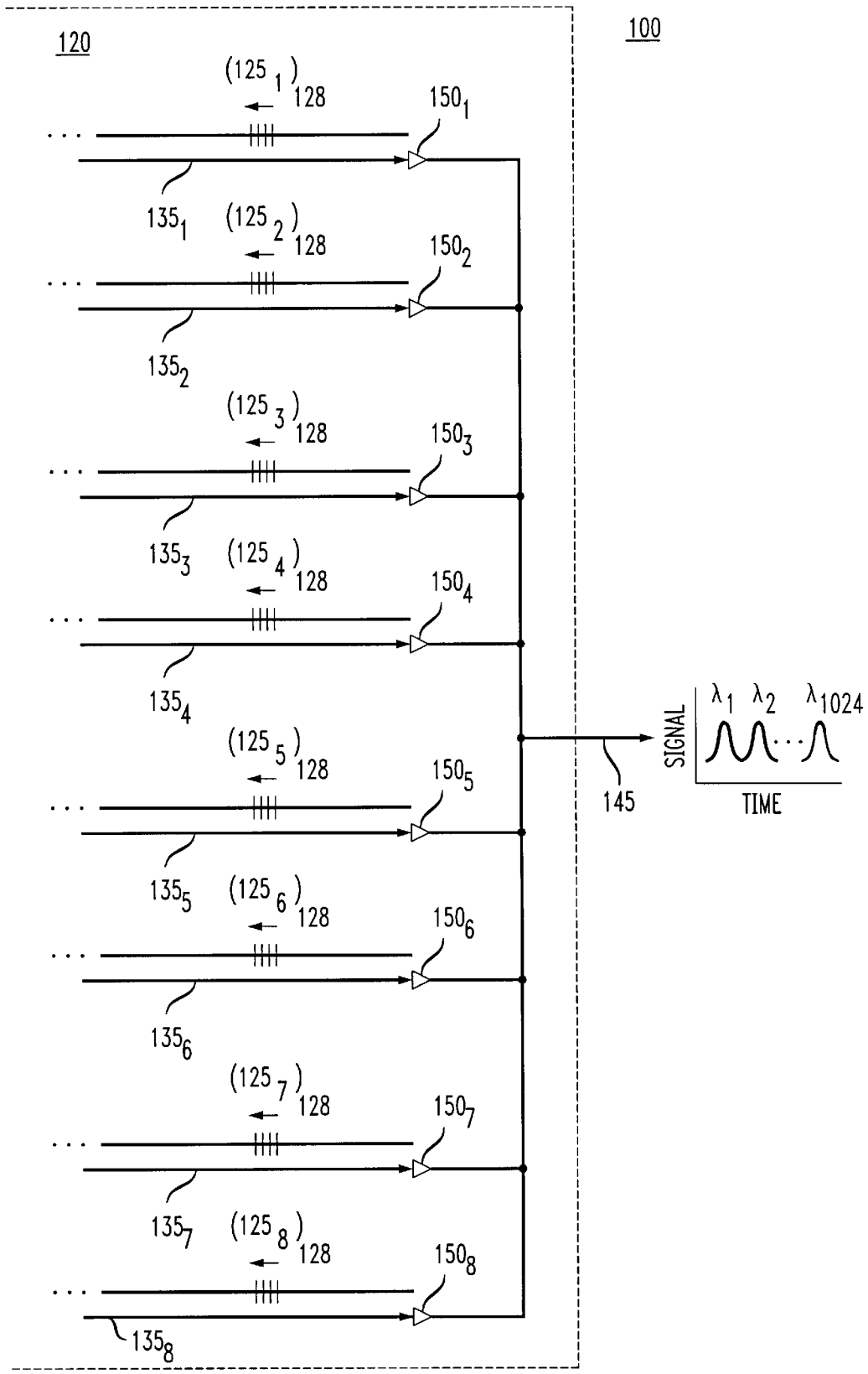

To more clearly illustrate the principles of the invention, shown in FIG. 7 is a three-stage (N=3) OSA 100 for measuring, with a resolution R=0.04 nm, the optical spectrum of WDM signal 105, consisting of optical channels spaced $\Delta\lambda = 0.4$ nm (50 GHz) within, for example, the so-called "C-band" (1528–1564 nm). To ensure that the spectral components in the time domain do not overlap, WDM signal 105 is pulsed, using for example an optical switch 180, which samples WDM signal 105 for a duration less than the time domain channel spacing, such as 0.4 nsec.

The first stage consisting of fiber based Mach-Zehnder interferometer $155_1$ has an input optical fiber A for receiving WDM signal 105, and two output optical fibers, $B_1$–$B_2$. With FSR=2R=0.08 nm, Mach-Zehnder interferometer $155_1$ slices WDM signal 105 into two groupings of alternating spectral components, with a first grouping $185_1$ of odd spectral components $(\lambda_1, \lambda_3 \ldots \lambda_{2^N M-1})$ communicated on optical fiber $B_1$, and a second band $185_2$ of even spectral components $(\lambda_2, \lambda_4 \ldots \lambda_{2^N M})$ communicated on optical fiber $B_2$. Recall that $\lambda_1$ refers to individual spectral components at intervals of $$\frac{k\Delta\lambda}{2^N M}$$

from 1528–1564 nm.

The second stage consisting of two parallel fiber based Mach-Zehnder interferometer $155_2$, $155_3$, are configured in a tree-structure to receive the groupings of sliced spectral components $185_1$, $185_2$ on its corresponding input optical fibers A. Likewise, each of the second stage Mach-Zehnder interferometers "slices" the groupings of spectral components $185_1$, $185_2$ into further groupings by transmitting every other "sliced" spectral components onto its output optical fiber $C_1$–$C_4$ as follows: grouping $190_1$ of spectral components $\lambda_1, \lambda_5 \ldots \lambda_{2^N M-3}$ on optical fiber $C_1$; grouping $190_2$ of spectral components $\lambda_3, \lambda_7 \ldots \lambda_{2^N M-1}$ on optical fiber $C_2$; grouping $190_3$ of spectral components $\lambda_2, \lambda_6 \ldots \lambda_{2^N M-2}$ on optical fiber $C_3$; and grouping $190_4$ of spectral components $\lambda_4, \lambda_8 \ldots \lambda_{2^N M}$ on optical fiber $C_4$. Of course, this is accomplished by setting the FSR of the second stage Mach-Zehnder interferometers to have twice the value as those of the previous stage (FSR=4R=0.16 nm).

Now, the third stage consisting of four parallel Mach-Zehnder interferometers $155_4$–$155_7$ (FSR=8R=0.32 nm) are likewise configured in a tree architecture so as to receive the groupings of sliced spectral components $190_1$–$190_4$ from preceding Mach-Zehnder interferometers $155_2$–$155_3$. Again, each of the preceding groupings $190_1$–$190_4$ of sliced spectral components is filtered in the foregoing described manner, with the groupings of the sliced spectral components appearing on output ports $D_1$–$D_8$ ($115_1$–$115_8$), respectively, such that eight (8) groupings $195_1$–$195_8$ of one hundred twenty-eight (128) sliced spectral components appear as follow:

| Output Optical Fiber | Spectral Components |
|---|---|
| $115_1$ ($D_1$) | ($195_1$) $\lambda_1, \lambda_9, \lambda_{17}, \ldots$ |
| $115_2$ ($D_2$) | ($195_2$) $\lambda_5, \lambda_{13}, \lambda_{21}, \ldots$ |
| $115_3$ ($D_3$) | ($195_3$) $\lambda_3, \lambda_{11}, \lambda_{19}, \ldots$ |
| $115_4$ ($D_4$) | ($195_4$) $\lambda_7, \lambda_{15}, \lambda_{23}, \ldots$ |
| $115_5$ ($D_5$) | ($195_5$) $\lambda_2, \lambda_{10}, \lambda_{18}, \ldots$ |
| $115_6$ ($D_6$) | ($195_6$) $\lambda_6, \lambda_{14}, \lambda_{22}, \ldots$ |
| $115_7$ ($D_7$) | ($195_7$) $\lambda_4, \lambda_{12}, \lambda_{20}, \ldots$ |
| $115_8$ ($D_8$) | ($195_8$) $\lambda_8, \lambda_{16}, \lambda_{24}, \ldots$ |

For the sake of clarity, a depiction of the individual spectral components appearing at each stage as well as at each output optical fiber $115_1$–$115_8$ is depicted in FIG. 8.

Figure 9:
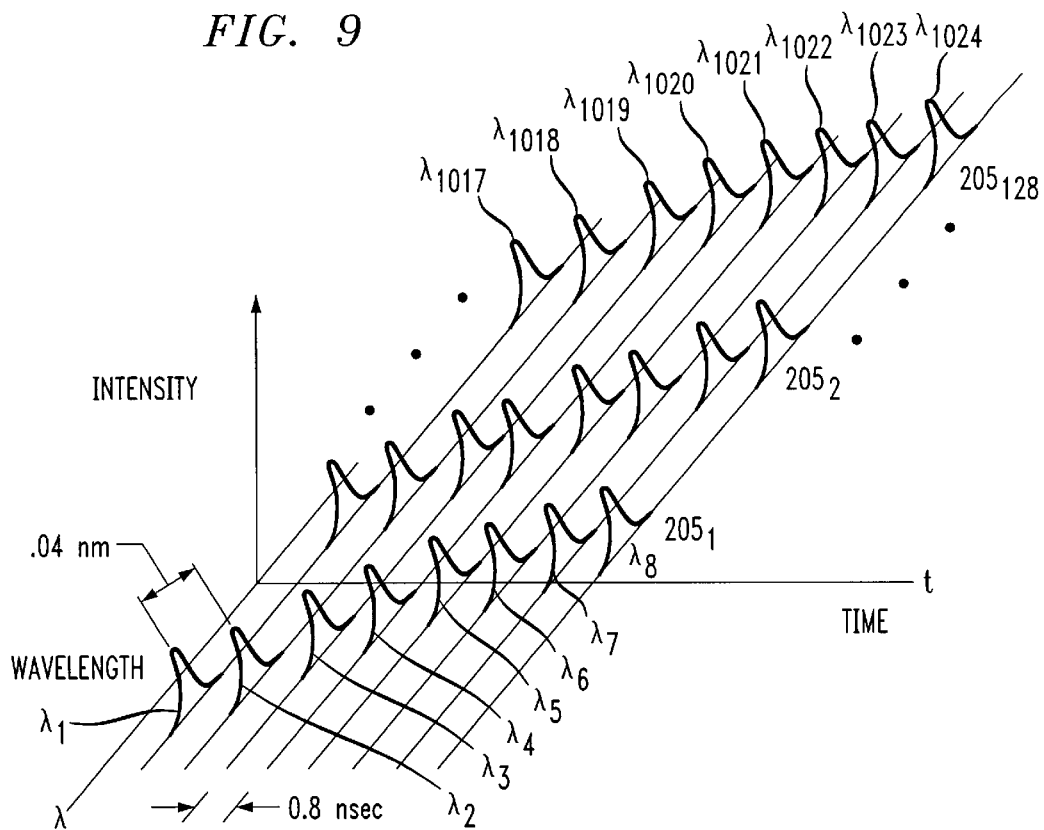
FIG. 9 is a graph of sliced spectral components in the optical spectrum analyzer of FIG. 7 as a function of time and wavelength, after propagating through a first set of fiber delay lines.

Each of the 0.04 nm wide individual sliced spectral components in each of the eight bands $195_1$–$195_8$ is then allocated a unique time slot using two sets of delay lines, implemented preferably using fibers. Note that the delay is equal to the propagation time in circulating through the corresponding length of fiber. A first set of delay lines $200_2$–$200_8$ located between the $2^N-1=7$ optical fibers $115_2$–$115_8$ and fiber Bragg gratings $(125_2)_1 \ldots (125_1)_{128}$ through $(125_8)_1 \ldots (125_8)_{128}$ delays each spectral component by a multiple integer of, for example, 0.8 nsec such that in the time domain the 1024 resolved spectral components are grouped into 128 groups $205_1$–$205_{128}$ of eight nsecutively numbered sliced spectral components separated 0.8 nsec apart, as depicted in FIG. 9. This is accomplished by employing an integer number of 16 cm length fibers for the spectral components, as follows:

| Output | Spectral Components | Delay Time | |
|---|---|---|---|
| $115_1$ ($D_1$) | $(205_1) \sum_{i=1}^{i=M} \lambda_{i2^N-7}$ | 0 × 16 cm delay lines | (0 nsec) |
| $115_2$ ($D_2$) | $(205_2) \sum_{i=1}^{i=M} \lambda_{i2^N-6}$ | 4 × 16 cm delay lines | (3.2 nsec) |
| $115_3$ ($D_3$) | $(205_3) \sum_{i=1}^{i=M} \lambda_{i2^N-5}$ | 2 × 16 cm delay lines | (1.6 nsec) |
| $115_4$ ($D_4$) | $(205_4) \sum_{i=1}^{i=M} \lambda_{i2^N-4}$ | 6 × 16 cm delay lines | (4.8 nsec) |
| $115_5$ ($D_5$) | $(205_5) \sum_{i=1}^{i=M} \lambda_{i2^N-3}$ | 1 × 16 cm delay lines | (0.8 nsec) |
| $115_6$ ($D_6$) | $(205_6) \sum_{i=1}^{i=M} \lambda_{i2^N-2}$ | 5 × 16 cm delay lines | (4.0 nsec) |
| $115_7$ ($D_7$) | $(205_7) \sum_{i=1}^{i=M} \lambda_{i2^N-1}$ | 3 × 16 cm delay lines | (2.4 nsec) |
| $115_8$ ($D_8$) | $(205_8) \sum_{i=1}^{i=M} \lambda_{i2^N}$ | 7 × 16 cm delay lines | (5.6 nsec) |

For each optical fiber $115_1$–$115_8$, fiber Bragg gratings $(125_1)_1 \ldots (125_1)_{128}$ through $(125_8)_1 \ldots (125_8)_{128}$, respectively, are also arranged such that the shortest wavelength spectral components are reflected first and the longest wavelength last. As such, the transmission peaks, i.e., Bragg wavelengths, of the fiber Bragg gratings corresponding to each optical fiber $115_1 \ldots 115_8$ are spaced at intervals of 0.32 nm apart from 1528–1564 nm.

Optical couplers or circulators $130_1$–$130_8$ couple the corresponding sliced spectral components $(\lambda_1)_1 \ldots (\lambda_1)_{128}$ through $(\lambda_8)_1 \ldots (\lambda_8)_{128}$ into time slot allocation stage 120, while allowing reflected, sliced spectral components from the Bragg gratings to egress therefrom along optical fibers $135_1$–$135_8$.

Figure 10:
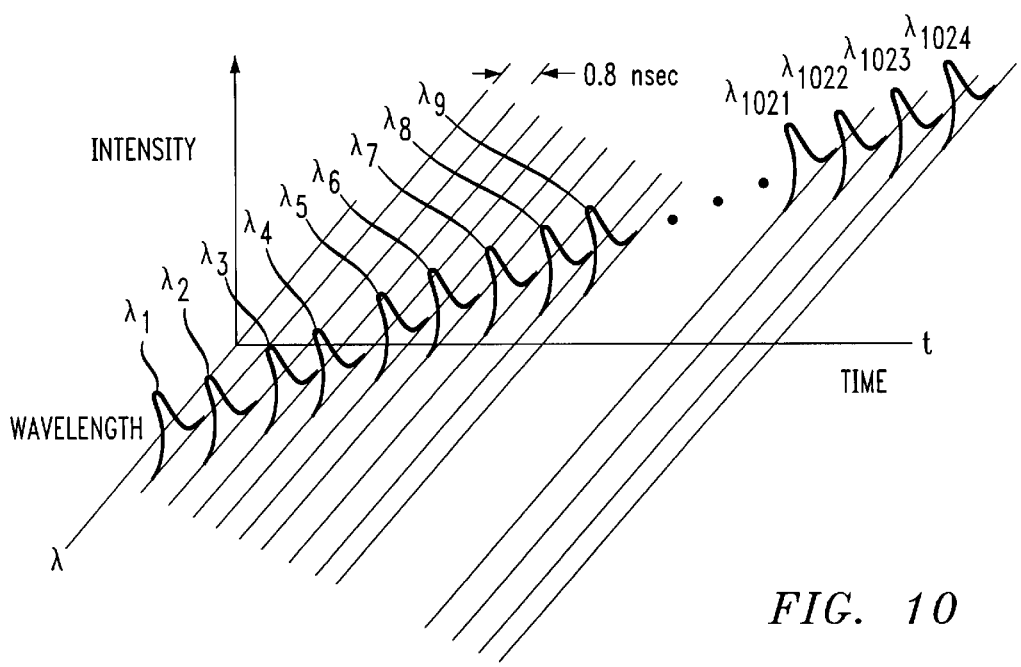
FIG. 10 is a graph of the sliced spectral components in the optical spectrum analyzer of FIG. 7 as a function of time and wavelength, after propagating through a second set of fiber delay lines.

Additionally, a delay of 3.2 nsec (a 64 cm length of fiber) disposed between each fiber Bragg grating, delays the reflections from each successive fiber Bragg grating so as to in effect offset each spectral component in groupings $205_1$–$205_{128}$ from one another. In doing so, each of the 128 groupings of eight (8) sliced spectral components $205_1$–$205_{128}$ is delayed 6.4 nsec from the previous one so as to uniformly space each spectral component 0.8 nsec apart, and in the order of its spectral component number, as depicted in FIG. 10. In this latter manner, each sliced spectral component is thus allocated a unique slot within the time domain for conversion into electrical signal 145 by corresponding optical detectors $150_1 \ldots 150_8$ which are coupled to optical fibers $135_1$–$135_8$, respectively. Preferably, the optical detectors employ a low pass filter to remove the modulated information on each optical channel. Alternatively, the spectrum analysis measurement may be repeated several times to improve the signal-to-noise ratio by averaging.

If desired, the above "wavelength slicing" function can be constructed with less or more than three stages, but there will be a tradeoff between the numbers of fiber Bragg gratings and Mach-Zehnder interferometers. Decreasing the number of stages in the filter reduces the number of Mach-Zehnder interferometers, but correspondingly increases the number of fiber Bragg gratings. While fiber Bragg gratings are more easily fabricated, increasing their number greatly increases out-of-band transmission loss, which eventually becomes prohibitive.

One advantage, however, of a multiple-stage filter or "wavelength slicer" is that it can provide greater separation between the transmission peaks than a single-stage filter. Although a single-stage filter can be used for directing alternate spectral components between two ports, crosstalk therebetween is significantly diminished with the use of multiple stages. Because the intensity transmissions for the Mach-Zehnder interferometer are complementary, a fraction of the power in the alternate spectral components of one branch appears in the other branch. When stages are cascaded, the overall intensity transmission, however, is given by the product of the individual intensity transmissions, significantly diminishing the crosstalk. In this regard, FIG. 11 depicts the individual intensity transmissions for each individual stage, as well as the overall intensity transmission TAD, for the upper arms of the three Mach-Zehnder interferometers $155_1$, $155_2$, $155_4$, which is given by:

$$T_{A-D_1} = \cos^2\left(\frac{\Pi\lambda}{FSR_1}\right) \cos^2\left(\frac{\Pi\lambda}{FSR_2}\right) \cos^2\left(\frac{\Pi\lambda}{FSR_4}\right)$$

where $FSR_1$, $FSR_2$, $FSR_4$ are the free spectral ranges for Mach-Zehnder interferometers $155_1$, $155_2$, $155_4$, respectively. Note that the main transmission peaks tend to become narrower and the finesse tends to increase with multiple stages since out-of-band spectral components are attenuated. It is, however, desirable to keep the total number of stages relatively low to minimize complexity, and thus facilitate compact packaging.

Figure 12:
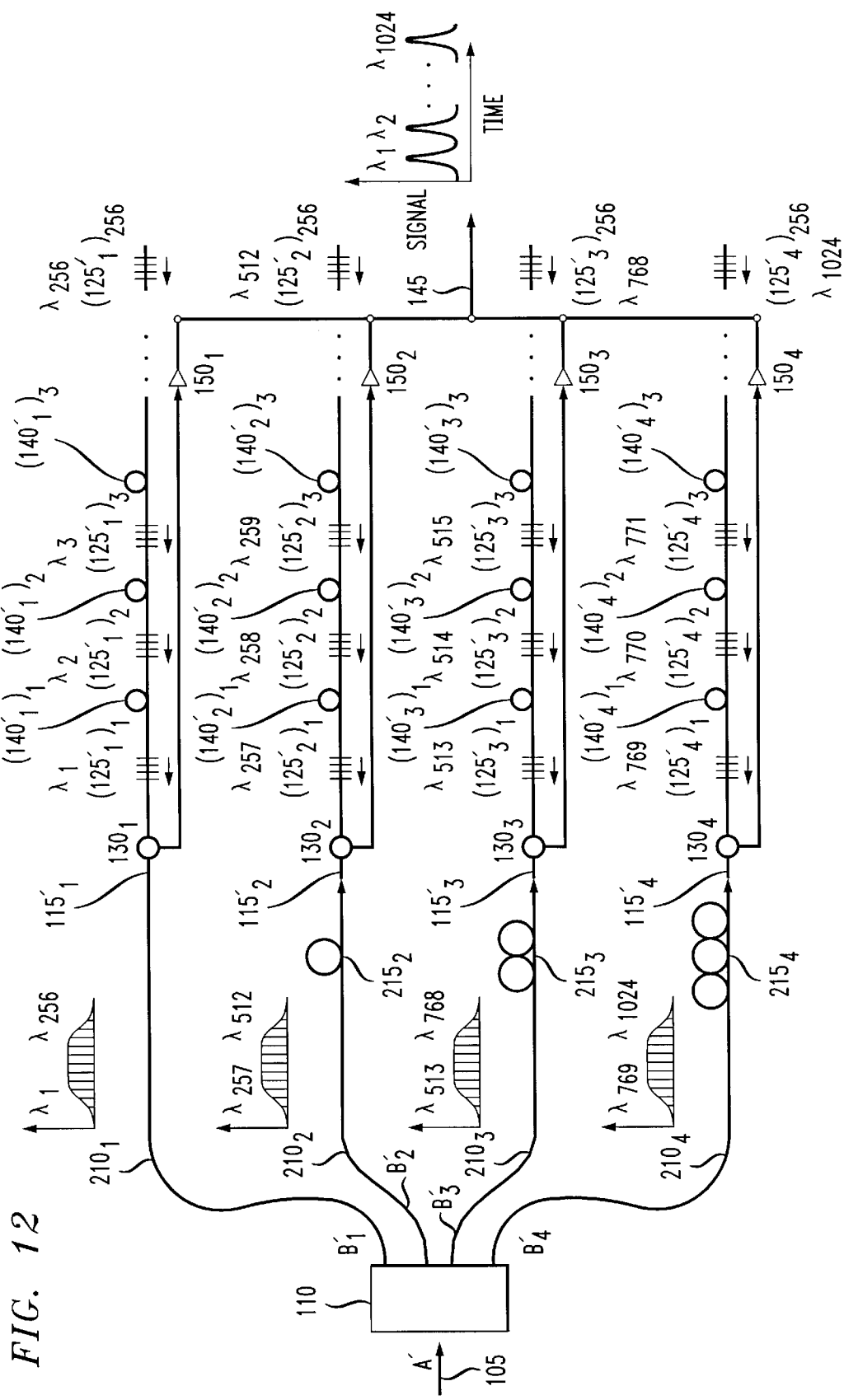
FIG. 12 is a block diagram of a second embodiment of an optical spectrum analyzer employing a single-stage "wavelength slicing" stage.

Referring now to FIG. 12, there is illustrated a second embodiment of the present invention which is similar to the embodiment of FIG. 7, except that a single stage filter or wavelength slicer 110' is employed which, however, does not transmit alternating spectral components. Filter 110' has an input fiber port A' for receiving WDM signal 105, and four output optical fibers, $115'_1$–$115'_4$ ($B'_1$–$B'_4$). Filter 110' slices WDM signal 105 into four consecutive bands of contiguous sliced spectral components so as to slice a first band $210_1$ of consecutive spectral components ($\lambda_1, \lambda_2 \ldots \lambda_{256}$) onto optical fiber $115'_1$ ($B'_1$); a second band $210_2$ of consecutive spectral components ($\lambda_{257} \ldots \lambda_{512}$) onto optical fiber $115'_2$ ($B'_2$); a third band $210_3$ of consecutive spectral components ($\lambda_{512} \ldots \lambda_{768}$) onto optical fiber $115'_3$ ($B'_3$); and a fourth band $210_4$ of spectral components ($\lambda_{769} \ldots \lambda_{1024}$) onto optical fiber $115'_4$ ($B'_4$). This slicing function may be accomplished, for example, by splitting WDM signal 105 into four, and then transmitting the desired wavelength portions of WDM signal 105 on each fiber using filters that match the spectral bandwidths of wavelength bands $210_1$–$210_4$ from 1528–1564 nm, given by $$\left(\frac{k\Delta\lambda}{4}\right).$$

Figure 13:
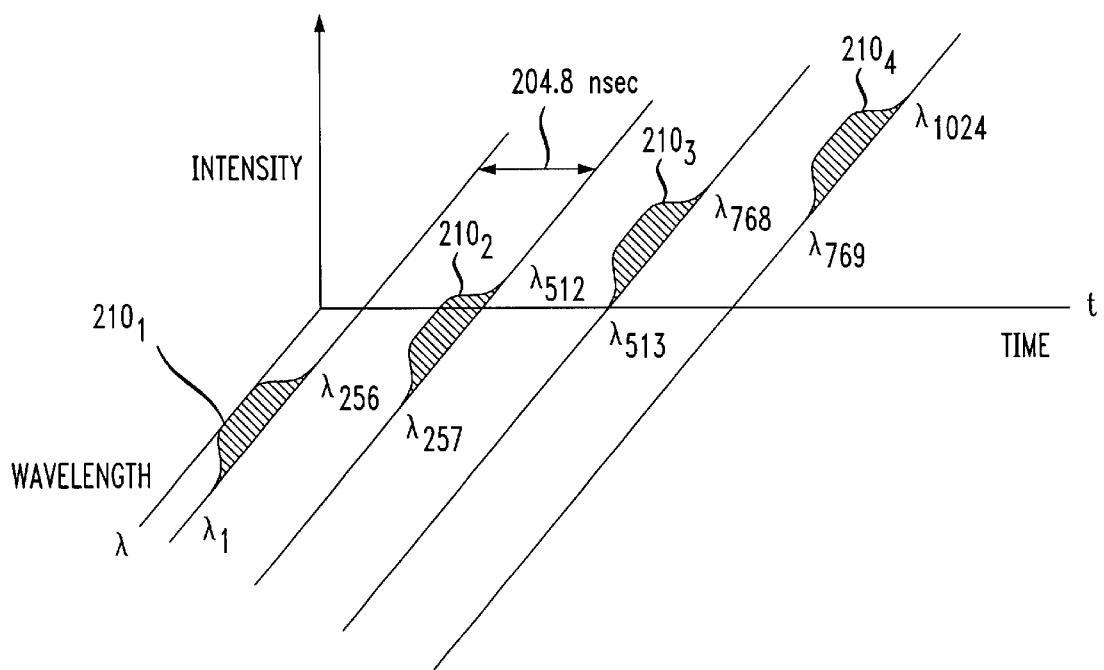
FIG. 13 is a graph of the sliced spectral components in the optical spectrum analyzer of FIG. 12 as a function of time and wavelength, after propagating through a first set of fiber delay lines.

Similarly, each spectral component in each of the four bands of sliced spectral components $210_1$–$210_4$ is then allocated a unique time slot using two sets of delay lines. A first set of delay lines $215_2$–$215_4$ between optical fibers $B'_2$–$B'_4$ and fiber Bragg gratings $(125_2)_1 \ldots (125_1)_{256}$ through $(125'_4)_1 \ldots (125'_4)_{256}$ delays each band of spectral components by a multiple integer of 204.8 nsec (a 40.96 m length of fiber) such that in the time domain each of four (4) bands $210_1$–$210_4$ of spectral components is separated 204.8 nsec apart, as depicted in FIG. 13. This is accomplished by employing fiber delay lines for the sliced spectral components, as follows:

| Optical Fiber | Spectral Components | Delay Time | |
|---|---|---|---|
| $B'_1$ | $(210_1)\sum_{i=1}^{256} \lambda_i$ | 0 × 40.96 m delay lines | (0 nsec) |
| $B'_2$ | $(210_2)\sum_{i=257}^{512} \lambda_i$ | 1 × 40.96 m delay lines | (204.8 nsec) |
| $B'_3$ | $(210_3)\sum_{i=513}^{768} \lambda_i$ | 2 × 40.96 m delay lines | (81.92 nsec) |
| $B'_4$ | $(210_4)\sum_{i=769}^{1024} \lambda_i$ | 3 × 40.96 m delay lines | (122.88 nsec) |

For each optical fiber $115'_1$–$115'_4$, fiber Bragg gratings $(125'_1)_1 \ldots (125'_1)_{256}$ through $(125'_4)_1 \ldots (125'_4)_{256}$ are arranged with transmission peaks or Bragg wavelengths at intervals of R=0.04 nm from 1528–1564 nm, and corresponding to the respective spectral bandwidth of the bands of sliced spectral components. Likewise, the gratings are arranged such that the shortest wavelength components are reflected first and the longest wavelength last. Additionally, delays $(140'_1)_1 \ldots (140'_1)_{255}$ through $(140'_4)_1 \ldots (140'_4)_{255}$ each of 0.4 nsec (a 8 cm length of fiber), disposed between each fiber Bragg grating, delays the reflections from each successive fiber Bragg grating by an amount that offsets each desired spectral component by 0.8 nsec from one another, and once again in the order of its spectral number, as likewise depicted in FIG. 10.

Preferably, the above optical devices are fabricated using, in part, the so-called "OptiFlex" fiber technology so as to facilitate fabrication and packaging. This OptiFlex technology is disclosed in U.S. Pat. Nos. 5,155,785; 5,259,051; and 5,421,930 which are incorporated herein by reference. Using this technology, a robotic routing machine is employed to apply optical fibers in a routing pattern, such as nested loops, onto a flat surface, such as a flexible plastic or film. The fibers are bonded to the surface using a pressure-sensitive adhesive, and then may be exposed to UV radiation so as to write the periodical refractive variation to form the fiber Bragg gratings. Likewise, the fibers may be routed onto the surface in nested loops of a desired length to form the delay lines, and along with the use of mass fusion splices can be used to fabricate the Mach-Zehnder interferometers. After routing, the fibers may be covered by a plastic sheet that encapsulates them to protect them against damage.

As a result, a spectrum analysis can be conducted with the desired resolution bandwidth by adjusting the FSR of the filters, and more particularly, the FSR of the first stage filter. Note, however, that in the second embodiment, the resolution bandwidth may be set by adjusting the pitch of the fiber Bragg gratings. More importantly, inasmuch as the optical spectrum is obtained without the use of mechanical moving elements, the present OSA can be readily employed to obtain the wavelength spectrum in tens to hundreds of microseconds. In this manner, the optical channels may be monitored in real-time so as, for example, to maintain constant the power level therein regardless of operating conditions.

It should be understood that the embodiments herein above are merely illustrative of the principles of the invention. Various modifications may be made by those skilled in the art which will embody the principles of the invention and fall within the spirit and the scope thereof.

What is claimed is:

1. An optical spectrum analyzer for measuring the spectral characteristics of an optical signal, comprising:
   means for slicing the optical signal into groupings of sliced spectral components, each grouping along a different optical path and each grouping consisting of different sliced spectral components of said optical signal;
   means coupled to said optical paths for mapping said sliced spectral component into time mapped spectral components such that each sliced spectral component is allocated a unique time slot in the time domain; and
   means for converting said time mapped spectral components into a corresponding electrical signal.

2. The optical spectrum analyzer of claim 1 wherein each group of sliced spectral components is a band of contiguous sliced spectral components.

3. The optical spectrum analyzer of claim 1 wherein there are $2^N$ groupings of M sliced spectral components, each grouping along one of $2^N$ optical paths, wherein N and M are positive integer numbers.

4. The optical spectrum analyzer of claim 3 wherein each of said u sliced spectral components on said $2^N$ optical paths consists of every other $2^{N^{th}}$ spectral components.

5. The optical spectrum analyzer of claim 1 wherein said means for slicing includes a tree-structure of N-stage filters having periodic passbands, wherein N is a positive integer number.

6. The optical spectrum analyzer of claim 5 wherein said filters transmit on each of two output ports alternating sliced spectral components.

7. The optical spectrum analyzer of claim 5 wherein each filter has a free spectral range (FSR) twice that of the filters in the preceding stage.

8. The optical spectrum analyzer of claim 5 wherein said filters include Mach-Zehnder interferometers.

9. The optical spectrum analyzer of claim 1 further comprising an optical switch for switching the optical signal to said means for slicing.

10. The optical spectrum analyzer of claim 1 wherein said means for slicing and said means for mapping are fabricated from optical fibers disposed on a flat surface.

11. The optical spectrum analyzer of claim 1 wherein said means for mapping includes a cascade of M fiber Bragg gratings on each of the $2^N$ optical paths, each of said fiber Bragg gratings having a Bragg wavelength corresponding to one of $2^N M$ spectral components, wherein N and M are positive integer numbers.

12. The optical spectrum analyzer of claim 11 further comprising means for coupling the M groupings of $2^N$ sliced spectral components to said means for mapping while allowing said M groupings of $2^N$ slice spectral components to egress upon being reflected from said fiber Bragg gratings.

13. The optical spectrum analyzer of claim 11 wherein said means for mapping included fiber delay lines on each of the $2^N$ optical paths for delaying the $2^N M$ spectral components.

14. The optical spectrum analyzer of claim 1 wherein said optical signal is WDM optical signal containing a plurality of optical channels.

15. The optical spectrum analyzer of claim 1 wherein said optical paths includes optical fibers.

16. An optical spectrum analyzer for resolving an optical signal into $2^N M$ spectral components, $\lambda_1$ to $\lambda_{2^N M}$, comprising:
   a first stage wavelength slicer for receiving the optical signal and for slicing the optical signal into $2^N$ groupings of M different sliced spectral components, each grouping along one of $2^N$ optical paths, wherein N and M are positive integer numbers; and
   a second stage means coupled to said $2^N$ optical paths for mapping each M sliced spectral component within said $2^N$ groupings into a time mapped spectral component such that each $2^N M$ spectral component is allocated a unique time slot in the time domain.

17. The optical spectral analyzer of claim 16 wherein said second stage mapping means includes delay lines.

18. The optical spectrum analyzer of claim 16 further comprising optical detectors for converting the $2^N M$ time mapped spectral components into an electrical signal.

19. The optical spectrum analyzer of claim 16 wherein the optical signal is a WDM optical signal carrying k optical channels separated $\Delta\lambda$ apart from a first wavelength to a second wavelength, wherein k is a positive integer number.

20. The optical spectrum analyzer of claim 19 wherein said first stage wavelength slicer is subdivided into N stages, with said $2^N$ groupings of M sliced spectral components consisting of spectral components spaced $$\left(\frac{k\Delta\lambda}{M}\right).$$

21. The optical spectrum analyzer of claim 16 wherein said first stage wavelength slicer is subdivided into N stages such that said $2^N$ groupings of M sliced spectral components consists of spectral components spaced every other $2^{N^{th}}$ spectral component.

22. The optical spectral analyzer of claim 21 wherein said first stage wavelength slicer includes $2^N - 1$ filters configured in a tree structure.

23. The optical spectral analyzer of claim 22 wherein each filter exhibits periodic transmission passbands having a free spectral range (FSR)

$$\frac{k\Delta\lambda}{2^{N-n}M},$$

where n is the stage number of the filter.

24. The optical spectral analyzer of claim 22 wherein each filter has twice the free spectral range (FSR) as filters in the previous stage.

25. The optical spectrum analyzer of claim 16 wherein said optical paths include optical fibers.

26. The optical spectrum analyzer of claim 16 wherein said first stage wavelength slicer includes Mach-Zehnder interferometers.

27. The optical spectral analyzer of claim 16 wherein said second stage mapping means includes M fiber Bragg gratings on each of said $2^N$ optical paths, each reflecting one of the $2^N M$ spectral components on the corresponding optical path while transmitting all other unselected spectral components.

28. The optical spectral analyzer of claim 27 wherein each of said M fiber Bragg gratings is arranged such the shortest wavelength spectral components are reflected first and the longest wavelength last.

29. The optical spectral analyzer of claim 27 further comprising means for coupling the $2^N$ groupings of M sliced spectral components from said first stage wavelength slicer to said second stage mapping means while allowing egress of reflected spectral components from said fiber Bragg gratings.

30. The optical spectral analyzer of claim 27 further comprising delay lines between the fiber Bragg gratings which delay the reflections from each successive fiber Bragg grating such that $2^N M$ spectral components are uniformly separated in time.

31. The optical spectrum analyzer of claim 16 further comprising an optical switch for coupling the optical signal to said first stage wavelength slicer for a desired duration of time.

32. The optical spectrum analyzer of claim 16 wherein said first stage wavelength slicer and said second stage mapping means are fabricated from optical fibers disposed on a flat surface.

33. An optical spectrum analyzer for resolving an optical signal having a spectral bandwidth from $\lambda_a$ to $\lambda_b$ into $2^N M$ spectral components spaced $$\frac{\lambda_b - \lambda_a}{2^N M}$$

and denoted by $\lambda_1$ to $\lambda_{2^N M}$, said optical spectrum analyzer comprising:
  a tree-structure of Mach-Zehnder interferometers transmitting on each of two output ports alternating spectral components coupled to input ports of next-stage Mach-Zehnder interferometers, such that the optical signal is sliced into $2^N$ groupings of M sliced spectral components on $2^N$ output ports of the last Mach-Zehnder interferometers;
  first set of $2^N$ delay lines, each coupled to one of the $2^N$ output ports for delaying each sliced spectral component such that the $2^N M$ spectral components are grouped into M sets of $2^N$ consecutively numbered sliced spectral components spaced apart in the time domain;
  on each of the $2^N$ output ports, M cascaded fiber Bragg gratings, each having Bragg wavelengths at intervals of $$\frac{\lambda_b - \lambda_a}{M}$$

from $\lambda_a$ to $\lambda_b$ for reflecting a corresponding spectral component; and
  second sets of delay lines disposed between the fiber Bragg gratings which delay the spectral components reflected from the fiber Bragg gratings so as to space apart each of the $2^N M$ spectral components from one another in the time domain, wherein N, M, a, and b are positive integer numbers.

34. The optical spectrum analyzer of claim 33 further comprising optical detectors for converting the $2^N M$ spectral components into an electrical signal.

35. The optical spectrum analyzer of claim 33 wherein the optical signal is a WDM optical signal carrying k optical channels separated $\Delta\lambda$ apart from $\lambda_a$ to $\lambda_b$, wherein k is a positive integer number.

36. The optical spectrum analyzer of claim 33 wherein with said $2^N$ groupings of M sliced spectral components consist of spectral components spaced $$\left(\frac{k\Delta\lambda}{M}\right),$$

wherein k is a positive integer number.

37. The optical spectrum analyzer of claim 33 wherein said $2^N$ groupings of M sliced spectral components consists of spectral components spaced every other $2^{N^{th}}$ spectral component.

38. The optical spectral analyzer of claim 33 wherein each Mach-Zehnder interferometer exhibits periodic transmission passbands having a free spectral range (FSR)

$$\frac{k\Delta\lambda}{2^{N-n}M},$$

where n is the stage number of the Mach-Zehnder interferometer.

39. The optical spectral analyzer of claim 33 wherein each Mach-Zehnder interferometer has twice the free spectral range (FSR) as those in the previous stage.

40. The optical spectral analyzer of claim 33 wherein said output ports include optical fibers.

41. The optical spectral analyzer of claim 33 wherein each of said fiber Bragg gratings is arranged such the shortest wavelength spectral components are reflected first and the longest wavelength last.

42. The optical spectral analyzer of claim 33 further comprising means for coupling the $2^N$ groupings of M sliced spectral components from said tree structure of Mach-Zehnder interferometers to said fiber Bragg gratings while allowing egress of reflected spectral components from said fiber Bragg gratings.

43. The optical spectrum analyzer of claim 33 further comprising an optical switch for coupling the optical signal to said tree-structure of Mach-Zehnder interferometers for a desired duration of time.

44. The optical spectrum analyzer of claim 33 wherein said tree-structure Mach-Zehnder interferometers, first and second sets of delay lines, and fiber Bragg gratings are fabricated from optical fibers disposed on a flat surface.

* * * * *